O. Pratt,
Well Tubing.
N° 60,057. Patented Nov. 27, 1866.
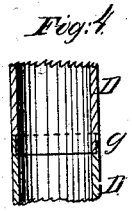
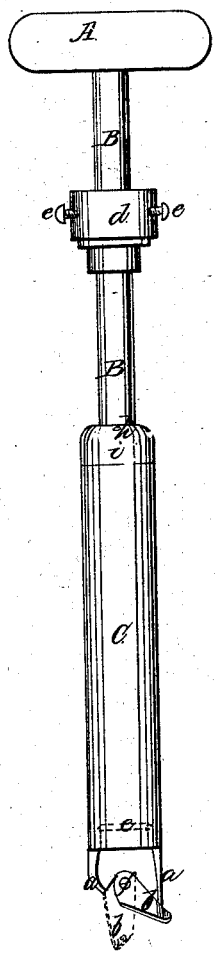
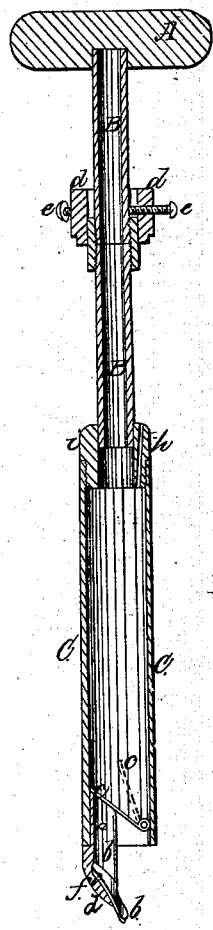
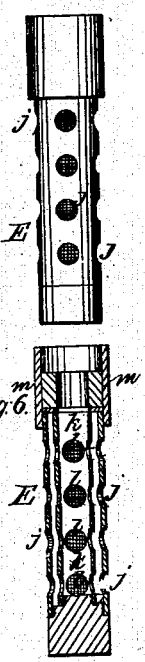
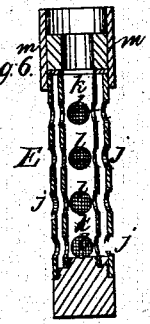

United States Patent Office.

IMPROVEMENT IN METHOD OF SINKING TUBULAR WELLS.

ORRIN PRATT, OF ATHOL, MASSACHUSETTS.

Letters Patent No. 60,057, dated November 27, 1866.

SPECIFICATION.

TO ALL WHOM IT MAY CONCERN:

Be it known that I, ORRIN PRATT, of Athol, in the county of Worcester, and State of Massachusetts, have invented certain new and useful improvements in boring for and Sinking Tubular Wells; and I do hereby declare the following to be a full, clear, and exact description of the manner of doing the same, reference being had to the accompanying drawings, making a part of this specification, in which—

Figure 1 represents an external view of the boring instrument for boring a hole, and sinking an external tube or case at the same time.

Figure 2 represents a vertical section through the same.

Figure 3 represents an external view of the outer tube.

Figure 4 represents a section through a portion of the same to show how the sections are united.

Figure 5 represents an external view of the strainer which sets in the bottom of the tubular well when made.

Figure 6 represents a vertical section through the strainer.

Similar letters of reference where they occur in the separate figures denote like parts of the apparatus in all of them.

My invention consists in the combined use of a boring instrument, working with, through, and under an external case or tube, so as to carry down with itself said external tube to the proper depth, and then be withdrawn through said external case, which remains for the proper placing of the tube and strainer, that forms the tubular well, and is then also withdrawn, leaving the tube and strainer to occupy the hole so bored.

To enable others skilled in the art to make and use my invention, I will proceed to describe the same with reference to the drawings.

The boring instrument is composed substantially of a handle, or other means of turning it, A; a rod or shaft B; a tube C; and the several necessary appliances connected thereto, viz, a lip $a$, a cutting tool $b$, peculiarly hung thereto, a valve $c$, and a collar $d$, made adjustable on the rod B, by means of the set-screws $e$, or otherwise. The lip $a$ projects below the bottom of the tube C, and the cutting or boring instrument $b$ is pivoted thereto, as at $f$, so that when it is cutting, as in the position shown in black lines in fig. 1, it will project beyond the outside perimeter of the tube, C, and far enough beyond to bore a hole capable of taking in an external tube, D, through which the tube C and the boring instrument can readily pass. And when the boring instrument is withdrawn for any purpose, said cutter $b$ will drop into the position shown by red lines in fig. 1, and thus allow the whole boring instrument to be readily drawn up out of the hole whilst the outer case remains in it. As the boring instrument goes down, the earth or other material loosened by it passes into the tube C, raising up the hinged valve $c$ in doing so. When the boring instrument is drawn up, the valve $c$ closes, and holds the material in the tube. When the boring instrument is passed through the outer tube D, the collar $d$ is set down on top of said outer tube, and there fastened. Now, by working the boring instrument, it descends and carries with it the outer tube or case. This outer tube is made in sections, and united by a bayonet fastening, $g$, or otherwise, so that they may be readily united or disconnected. The shaft or rod, B, can also be lengthened by added sections as the hole is bored deeper and deeper. The borings remain in the tube, C, and thus the nature and quality of the earths bored through are always known, as well as when water is reached, and the depth of it; and that there may be no hindrance to the filling of the tube, C, air or water holes, $h$, are made through its head or cap, $i$, for that purpose. When the hole is sufficiently deep and a supply of water obtained, the boring instrument is raised up and out of the hole, whilst the external case or tube D remains in it. Then a strainer, E, (made as hereafter described,) connected to a tube of sufficient length, is passed down through the external tube D, and when down the outer tube is withdrawn from the hole and the tubular well is finished and ready to receive a pump or any other means of drawing up water through it. Thus tubes are quickly and cheaply put down, to form wells, without driving them into the ground as now practised, and in which driving process there is no degree of certainty at all, if even they do not get jammed up or broken in the attempt. The strainer E, which forms the bottom of the tubular well, I make as follows: I first prepare an external tube, closed at its bottom, and bored full of holes, $j$. Inside of this tube I place a wire gauze screen of a corresponding tubular form, and inside of the gauze another tube, $k$, also bored full of holes, $l$. When the inner tube is thus placed, a nut, $m$, is run down against it and the gauze, and the whole is firmly held in place. The strainer will thus admit the water into the interior of the tubular well and keep out the sand or gravel which would choke it up.

Having thus fully described my plan of sinking tubular wells, what I claim therein as new, and desire to secure by Letters Patent, is—

So combining, with an external tube or case, a boring instrument, such as described, as that said instrument will bore a suitable hole for, and carry down with itself, the external tube, which can remain whilst the borer is withdrawn, and until the tubular well and strainer are introduced, and the external tube then withdrawn from the hole, the operation being such substantially as described.

ORRIN PRATT.

Witnesses:
   CHS. FIELD,
   AZER B. FOLSEM.